Patented Nov. 17, 1936

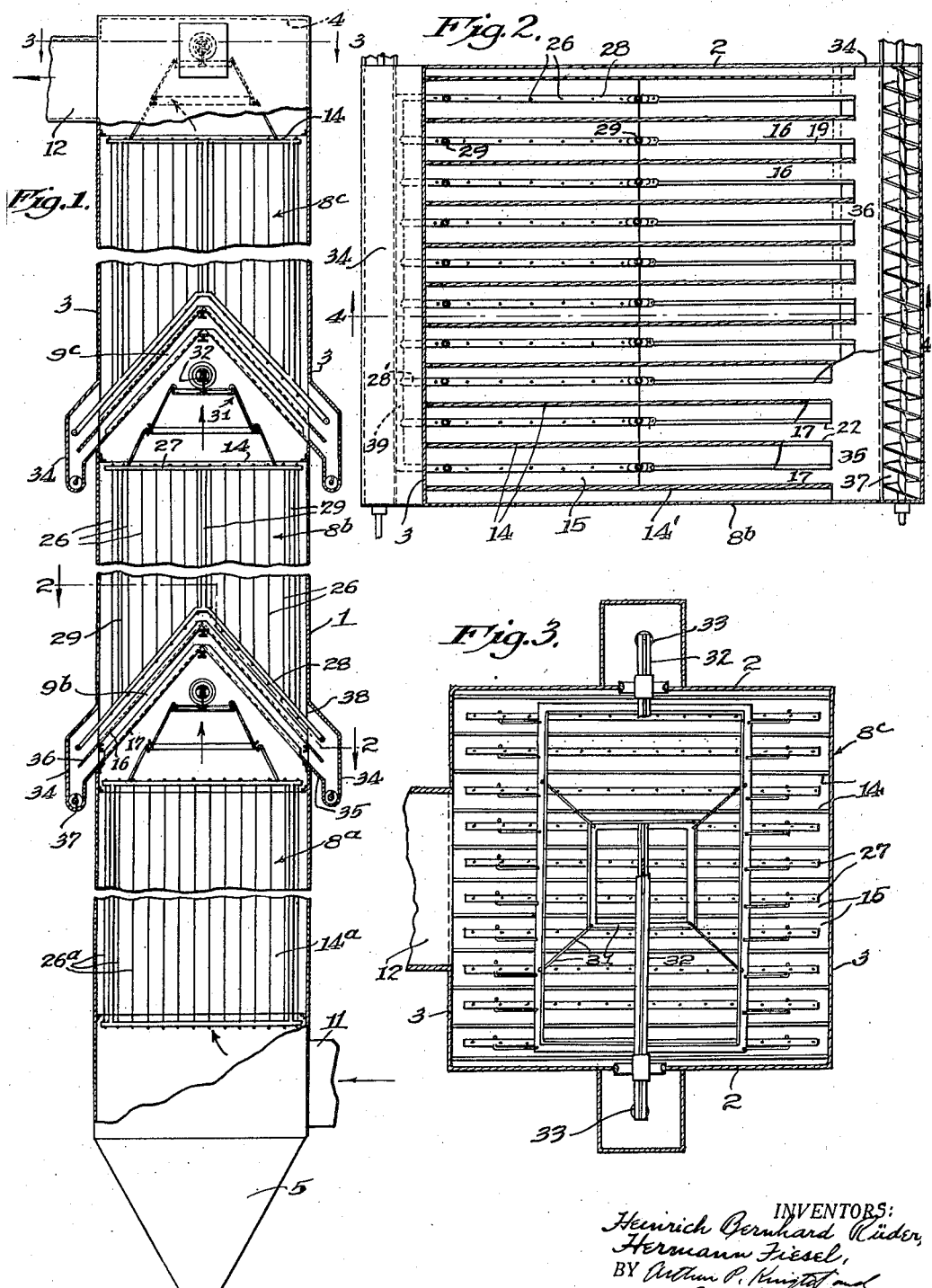

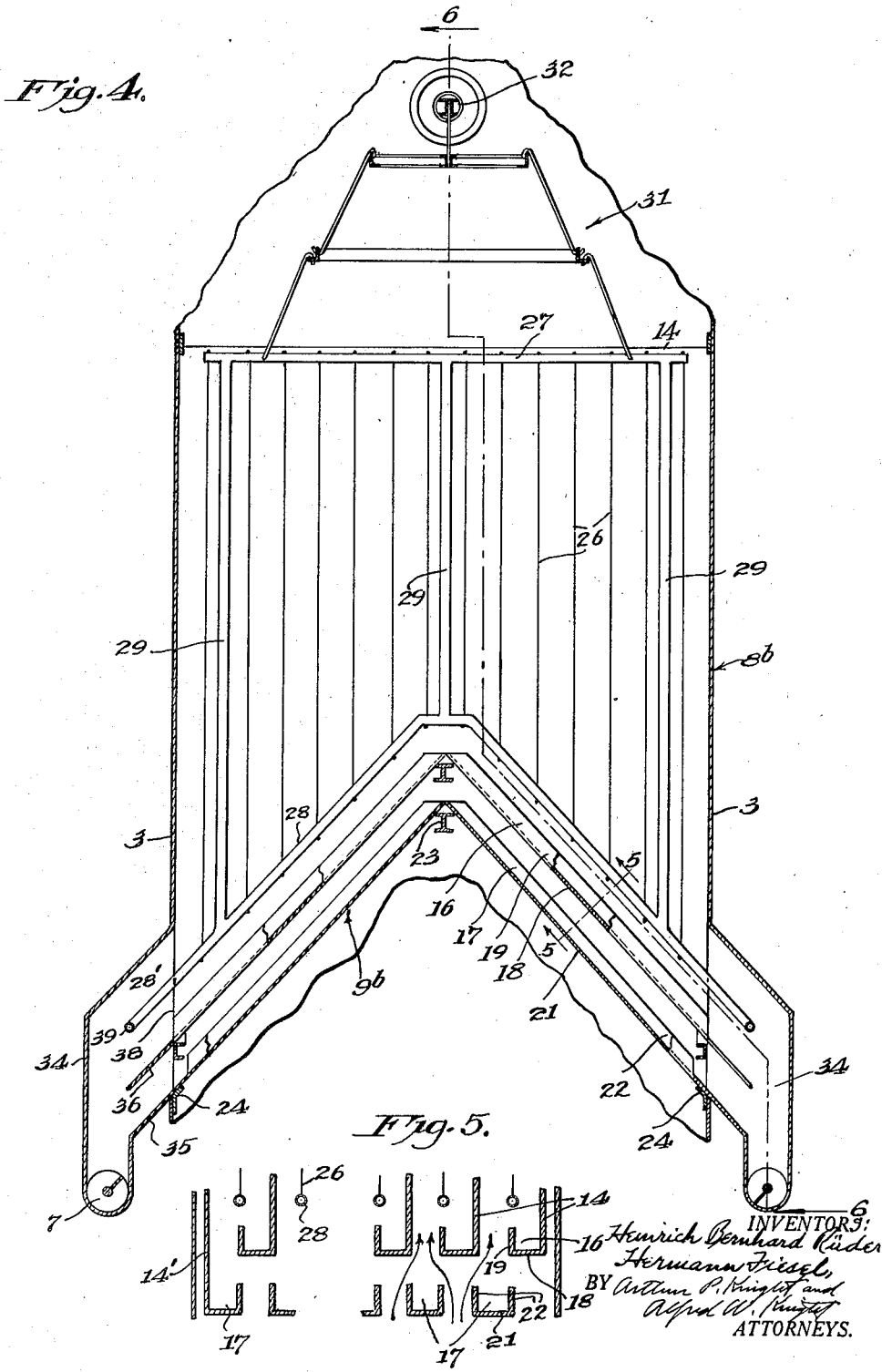

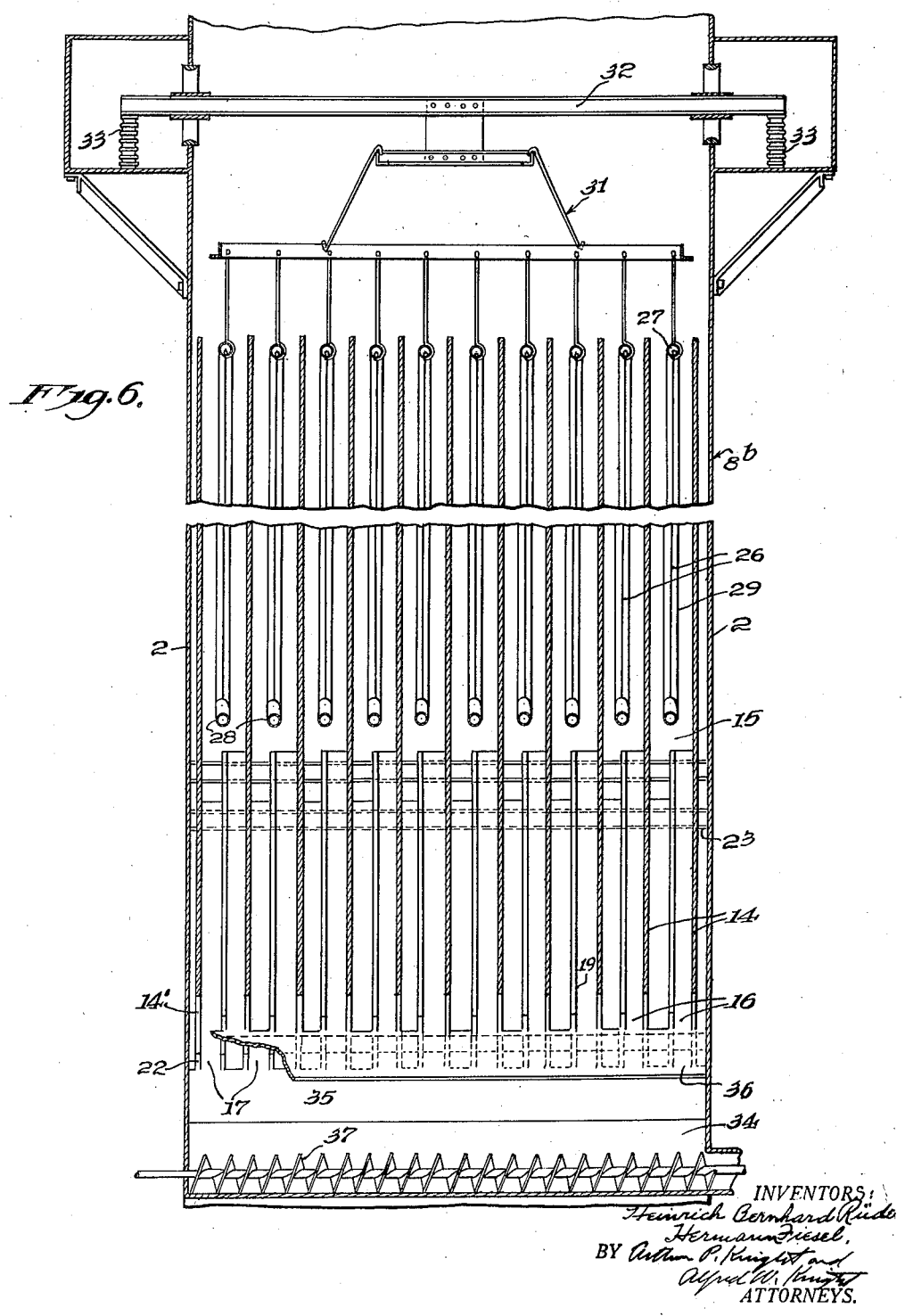

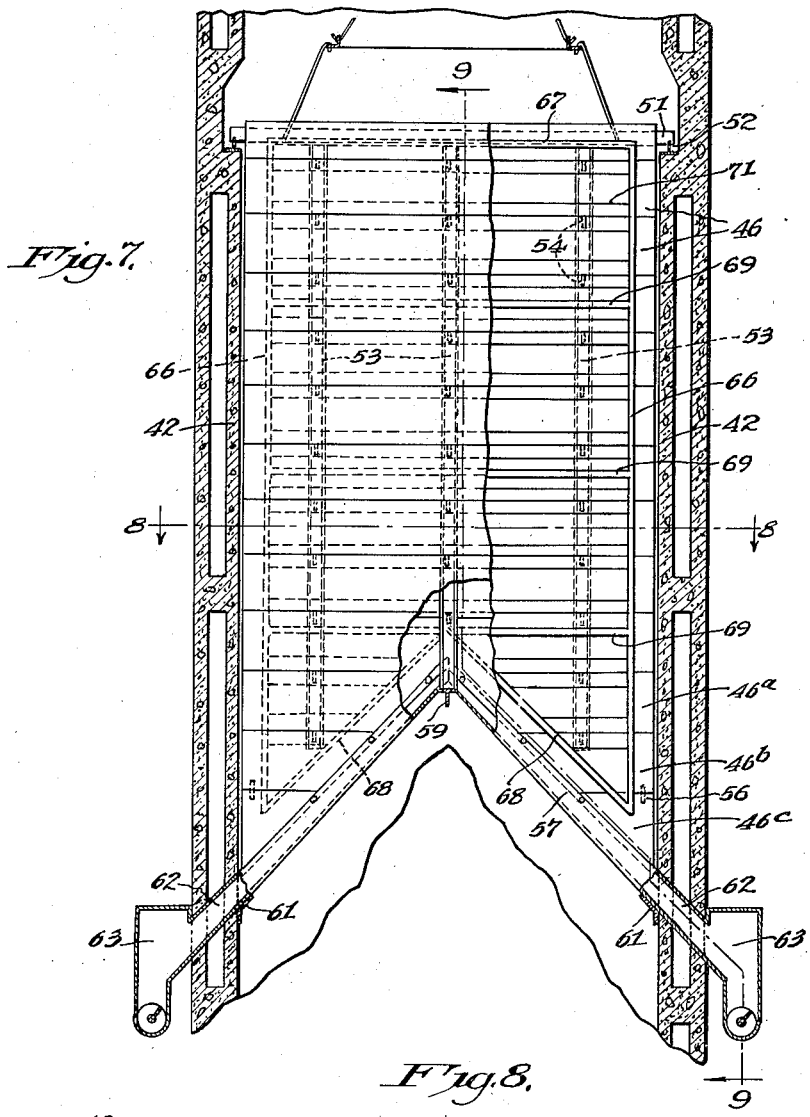
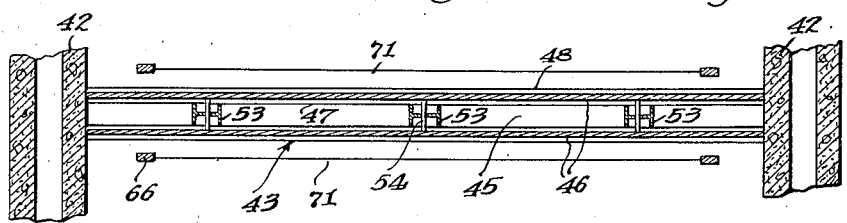

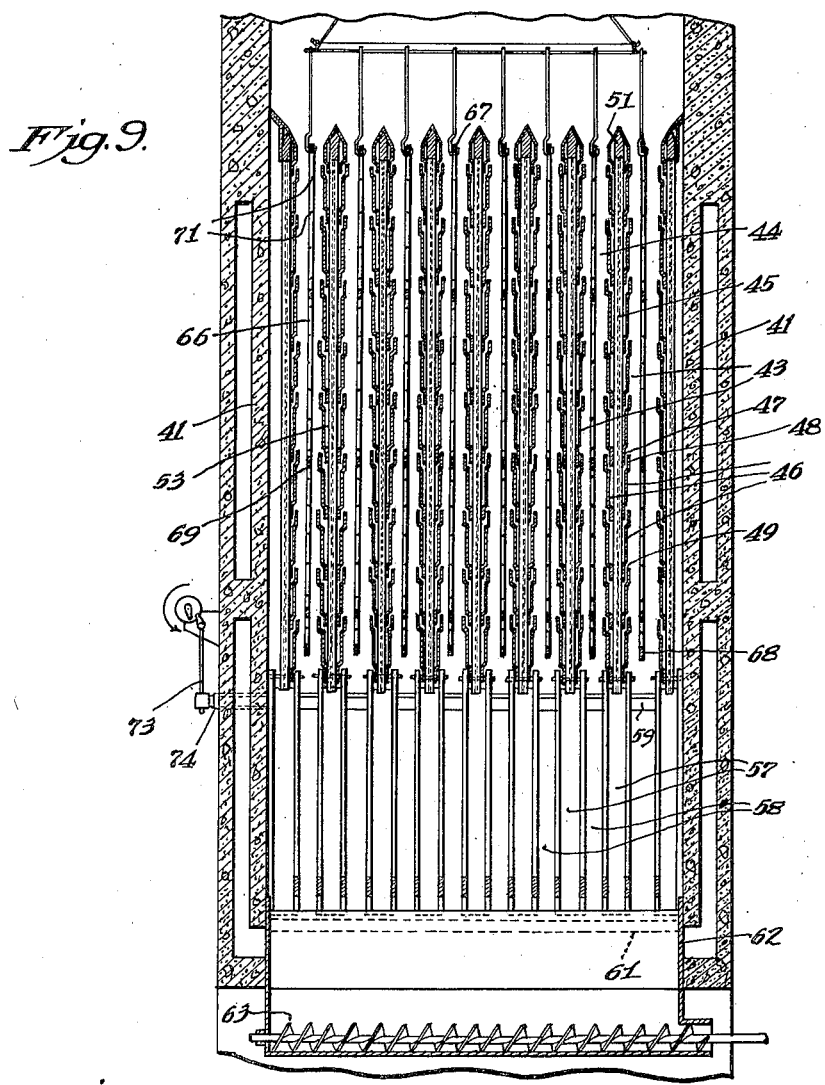
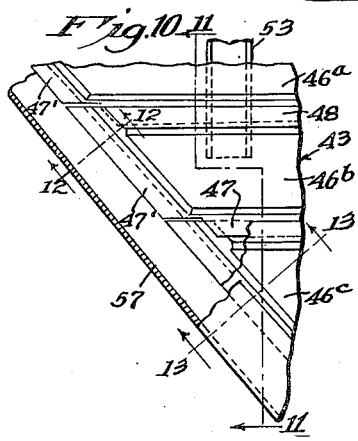
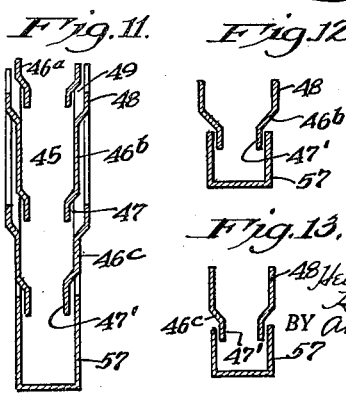
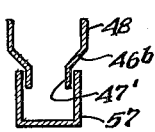
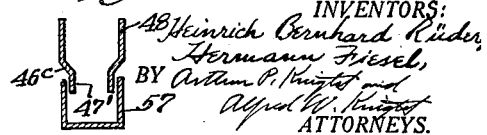

2,061,045

UNITED STATES PATENT OFFICE 2,061,045

APPARATUS FOR ELECTRICAL PRECIPITATION

Heinrich Bernhard Rüder, Schonberg in Taunus, and Hermann Fiesel, Frankfort-on-the-Main, Germany, assignors to International Precipitation Company, Los Angeles, Calif., a corporation of California Application May 2, 1936, Serial No. 77,602
In Germany April 26, 1935

6 Claims. (Cl. 183—7)

This invention relates to the electrical precipitation of suspended material from gases.

The principal object of the invention is to provide an apparatus in which a stream of gas to be cleaned is passed in a substantially vertical direction of flow, through a plurality of vertically superimposed electrical precipitator sections, each provided with discharge and collecting electrodes, and in which the material precipitated in each section is separately collected and removed from the path of the gas stream.

A further object of the invention is to provide an apparatus of the above type, in which the several precipitator sections are disposed one above another, within a common vertically extending housing, and in which the separate collection and removal of the precipitated material from each section is obtained without requiring any material departure or deflection of the gas stream from its vertical direction of flow, and without producing any appreciable disturbance in the vertical flow of the gas.

A further object of the invention is to provide a vertical flow precipitator in which a plurality of different portions of the suspended material are successively precipitated, and in which the successively precipitated portions of material are separately collected and removed.

Other objects of the invention will be pointed out hereinafter or will be apparent from the following description.

According to this invention, a plurality of precipitator sections, each comprising discharge and collecting electrode means insulated and spaced from one another, are disposed one above another in a common vertically extending housing and the gas to be cleaned is passed vertically through said housing and through said precipitator sections in series, and each precipitator section is provided with means disposed below the collecting electrodes of that section, for collecting the material precipitated in that section and for removing such material from the flow path of the gas within said housing.

The invention also includes certain novel structural arrangements for accomplishing the above stated objects, as more fully described hereinafter.

The accompanying drawings illustrate forms of apparatus embodying this invention and referring thereto:

Fig. 1 is a broken vertical section, partly in elevation, of one form of apparatus, provided with collecting electrodes of the plate-type;

Fig. 2 is a horizontal section on line 2—2 in Fig. 1, with portions of the structure broken away;

Fig. 3 is a horizontal section on line 3—3 in Fig. 1;

Fig. 4 is a somewhat enlarged vertical section of one section of the apparatus, taken on line 4—4 in Fig. 2;

Fig. 5 is a broken section on line 5—5 in Fig. 4;

Fig. 6 is a vertical section on line 6—6 in Fig. 4;

Fig. 7 is a view similar to Fig. 4, showing a modified form of construction embodying a different type of collecting electrodes;

Fig. 8 is a horizontal section through one of the collecting electrodes and the adjacent discharge electrode means, on line 8—8 in Fig. 7; and Fig. 9 is a vertical section on line 9—9 in Fig. 7;

Fig. 10 is an enlarged side elevation of a lower portion of one of the collecting electrodes shown in Figs. 7 and 9, with certain parts broken away;

Fig. 11 is a vertical section on line 11—11 in Fig. 10;

Figs. 12 and 13 are sectional views on lines 12—12 and 13—13, respectively, in Fig. 10.

The apparatus shown in Figs. 1 through 6 comprises a vertically extending housing 1, preferably of substantially rectangular cross-section, provided with side walls 2, end walls 3, top wall 4, and a hopper-shaped bottom portion 5.

A plurality of precipitator sections are provided within said housing, vertically superimposed above one another. Fig. 1 shows three such precipitator sections 8a, 8b, and 8c, but it will be understood that any desired number of such sections may be provided and that each section, as well as the entire structure, may be of any suitable or convenient height and shape. Each of the sections, with the exception of the lowermost section 8a, is shown as provided with special collecting means disposed immediately below the collecting electrodes of that section, as indicated generally at 9b and 9c, for collecting precipitated material and discharging the same from the housing. It will be understood that the lowermost section 8a may also be provided with similar means for collecting and discharging precipitated material, but the construction may be simplified by utilizing the hopper-shaped bottom portion 5 for receiving and collecting the precipitated material from said lowermost section. For this reason, the lowermost section is shown as being of somewhat different construction than the remaining sections 8b and 8c.

Suitable inlet and outlet connections are provided, for passing a gas stream vertically through the housing 1. For this purpose there are shown a flue 11 communicating with the interior of the housing below the lowermost section, and a flue 12 communicating therewith above the uppermost section. In case it is desired to pass the gas in an upward direction through the apparatus, as indicated by the arrows in Fig. 1, the flue 11 serves as an inlet and the flue 12 as an outlet, but it will be understood that the connections may be reversed and the gas passed downwardly through the apparatus.

The sections 8b and 8c are of similar construction, and such construction is best illustrated in Figs. 2 through 6. Each of said sections comprises a plurality of parallel collecting electrode units 14 of the vertical plate type, which may be of any suitable or well-known construction and may be supported within the housing in any suitable manner. Said electrode units, which are shown as comprising flat metal plates, extend between the end walls 3 and parallel to the side walls 2, and are suitably spaced from one another to provide gas passage spaces 15 therebetween. The lower edge of each collecting electrode plate is shown as having an inverted V shape, being inclined downwardly and outwardly from the central portion thereof to the opposite edges. Means are provided for collecting and removing precipitated material from below the collecting electrodes, and such means advantageously comprise channel members disposed below the collecting surfaces of said electrodes, extending adjacent and parallel to the inclined lower edges of said electrodes, and so arranged as to permit substantially free vertical flow of gas therebetween. In the construction shown, two alternately arranged, vertically superimposed, sets of such channel members are provided, as indicated at 16 and 17, respectively, the channel members of each set being spaced from one another, and the lower channel members 17 being vertically aligned below the spaces between the upper channel members 16, and being suitably spaced below said upper channel members. The upper channels 16 are shown as being formed as a part of or directly secured to the lower edges of the collecting electrode plates, each of said channels comprising a bottom wall 18 projecting laterally at one side of a corresponding electrode plate 14 and a side wall 19 extending upwardly from said bottom wall and spaced from said corresponding electrode plate, as shown in Fig. 5.

Each of the lower channels 17 comprises a bottom wall 21 and spaced upwardly inclined side walls 22. The channel members 16 and 17 are shown as extending substantially parallel to one another and inclined downwardly from the central portion of the respective collecting electrodes to the end walls 3. The lower channels 17 may be supported in any suitable manner, as by supporting members 23 and 24. If desired, one of the collecting electrode plates, such as 14', which is adjacent one side wall of the housing, may be extended somewhat below the lower edges of the other plates and may be connected to one of the lower channel members 17, as shown in Fig. 5.

Each of the precipitator sections 8b and 8c is also provided with discharge electrode means, which are shown as comprising fine wires or small rods 26. A discharge electrode unit is provided between each pair of adjacent collecting electrode plates 14, said discharge electrode units being disposed centrally of the spaces 15 between said plates. Each of said discharge electrode units is shown as comprising a plurality of discharge wires or members 26, extending vertically and spaced from one another, and mounted on a suitable frame, comprising a top member 27, a bottom member 28, and vertical members 29. Said discharge electrode units may be supported, and insulated from the collecting electrodes, in any suitable manner, as for example by a suitable supporting structure indicated generally at 31, which is in turn carried by a horizontal supporting member 32 mounted on insulating supports 33.

The channel members 16 and 17 open at their lower ends into closed receptacles or hoppers 34, extending along the respective end walls 3. Each of said receptacles 34 may be provided with a sloping bottom wall 35 adapted to receive material delivered by the lower channels 17, and an inclined plate 36 positioned above said bottom wall to receive material delivered by the upper channels 16, both of the members 35 and 36 being adapted to conduct the material from said channel members and deliver the same to suitable means such as a screw conveyor 37 for discharging such material from each of the receptacles 34.

As shown, the receptacles 34 may communicate with the interior of the precipitator housing through openings 38 in the end walls 3, extending upwardly from the bottom walls 35 of said receptacles, to a position somewhat above the upper channels 16, and the lower frame members 28 of the discharge electrode units may extend through said openings 38, beyond the edges of the collecting electrodes and into the upper portions of the receptacles 34, as shown at 28', and the projecting portions 28' may be connected to transversely extending bars or frame members 39, for the purpose of steadying the lower end portions of the several discharge electrode units.

The lowermost section 8a is shown as a conventional plate type precipitator, comprising a plurality of collecting electrode plates 14a corresponding in number and spacing to the plates 14 of the upper sections, and discharge electrode means 26a disposed between said collecting electrode plates and supported and insulated in a manner comparable to that above described in connection with the sections 8b and 8c. The principal distinction between the section 8a and the remaining sections is that the lower ends of the collecting electrodes and the discharge electrode units extend horizontally, and the channel members for receiving the precipitated material are omitted, the precipitated material from this lowermost section being allowed to fall into the hopper-shaped bottom 5.

The discharge and collecting electrode means of the several precipitator sections may be connected to any suitable source or sources of high tension current, preferably unidirectional current produced by rectification of alternating current at high potential, as is customary in electrical precipitation apparatus.

It will be understood that different electrical potentials may, if desired, be maintained between the discharge and collecting electrode means of the respective sections. Also, while the opposing electrode means are shown as being substantially equally spaced from one another in the several sections, it will be understood that different spacings may be provided in the respective sections, if desired.

In the operation of the apparatus above described, the gas to be cleaned may be delivered, for example, through inlet flue 11 to the lower end of the housing 1. The gas then passes upwardly through the precipitator sections 8a, 8b and 8c in series, and is discharged from the upper end of the apparatus through outlet flue 12.

In passing through each of the precipitator sections a portion of the suspended material contained in the gas is electrically precipitated upon the collecting electrode surfaces in the usual manner of such apparatus. The material so precipitated in each section, and falling from the collecting electrode surfaces, is collected and removed, separately from the material precipitated in the other sections. Thus, in the upper sections 8b and 8c, such material enters the channels 16 and 17 disposed immediately below each of said sections, and is delivered thereby into receptacles 34, while the material precipitated in section 8a falls into the hopper 5.

It will be understood that any suitable or well-known means may be provided for assisting in the removal of precipitated material from the surfaces of the collecting electrode means. For example, such collecting electrode means may be provided with devices such as are well-known in the art, for rapping or hammering said electrodes to dislodge the precipitated material, or for scraping or brushing the precipitated material therefrom, or means may be provided for supplying water or other liquid to the surfaces of said electrodes to wash down such precipitated material.

Referring to Fig. 5, it may be seen that the disposition of the channel members 16 and 17 is such as to permit substantially free upward flow of gas therebetween, without causing any abrupt lateral deflections of the gas. As indicated by the arrows, the gas passes upwardly through the spaces between the lower channels 17, and then divides and passes upwardly through the spaces between the upper channels 16, with only a very slight deflection in the normal upward direction of flow thereof. It will be seen that the upper edges of the lower channel side walls 22 should be spaced sufficiently below the upper channels 16 to provide ample space for flow of gas therebetween.

One advantage of the method and apparatus above described is that the material precipitated in each section is collected and removed from the gas stream instead of being allowed to fall down into the next lower section, thus avoiding the possibility of such material becoming again suspended in the gas and having to be re-precipitated. In case it is not desired to separately recover the material precipitated in the several sections, the material discharged from the several receptacles 34, as by screw conveyors 37, and the material discharged from the hopper 5, may be combined, by delivery thereof to a common storage means or the like. In certain cases, however, where the gas contains suspended materials which differ from one another, and in which one of such materials is more easily precipitated than another material, so that products of different characteristics may be collected in the successive precipitator sections, such products may be recovered separately, and the present invention is of particular advantage in such cases. For example, in the cleaning of gases from cement kilns, which contain not only mechanically entrained dust particles, but also fume particles of a relatively high potash content resulting from the volatilization and subsequent condensation of volatile potassium compounds present in the materials passed through the kilns, the dust particles tend to precipitate more readily than the fume particles. Therefore, by the use of the apparatus above described, it is possible to recover from the lower section a product consisting principally of the dust constituents relatively low in potash, and to recover from the successively higher sections products of progressively higher potash content, and such products may be separately recovered and utilized in different manners or for different purposes.

In Figs. 7 to 13, we have shown a different type of collecting electrode construction, and also a somewhat modified form of discharge electrode means, which may be advantageously employed in connection with this invention, it being understood that this modified construction may be embodied in any one or more of the precipitator sections shown in Fig. 1, and preferably in all of said sections.

The collecting electrodes shown in this application are of the type described in U. S. Patent No. 1,882,949, and are characterized by the provision of interior collecting spaces within the collecting electrodes, with horizontal slots or passages in the side walls of the electrodes, through which the precipitated material enters said interior collecting spaces, so that the material is quickly separated from the gas stream and permitted to fall to the lower ends of the collecting electrodes within said interior collecting spaces.

The precipitator housing is shown as comprising side walls 41 and end walls 42. Within said housing are mounted a plurality of collecting electrode units 43, arranged in a manner similar to the collecting electrode units 14 above mentioned so as to provide gas passage spaces 44 therebetween. Each of said collecting electrodes comprises two spaced side walls providing an interior collecting space 45 therebetween, and each of said side walls comprises a plurality of strips 46 extending horizontally across the width of the collecting electrode and lying substantially in vertical planes. Each strip has its lower edge portion offset inwardly and its upper edge portion offset outwardly, as indicated at 47 and 48, respectively, and the adjacent strips overlap one another so as to provide slots or passages 49 therebetween.

Each collecting electrode further comprises a supporting structure on which the strips 46 are mounted. Said supporting structure may comprise a top frame member 51, supported on the housing in any suitable manner as shown for example at 52, and a plurality of spaced vertical frame members 53 secured to said top frame member and extending downwardly therefrom to positions adjacent the lower edge of the collecting electrode. The strips 46 may be mounted on the vertical frame members 53 by means of suitable brackets, such as indicated at 54 in Figs. 7 and 8. The details of the shape of the strips 46, and the means for mounting the same, may conform substantially to those shown in the above mentioned U. S. Patent No. 1,882,949, in which these features are fully shown and described.

In this case also, the lower edges of the collecting electrodes may be of inverted V-shape, the strips at the lower portion of the collecting electrode, such as 46a, 46b and 46c, being formed and mounted so as to conform to this shape. Each of said strips 46a, 46b and 46c is also provided with an inwardly offset portion 47' along its inclined edge, as shown in Figs. 10 to 13. As shown, the lowermost strips 46c of each collecting electrode may be at least partially supported by means of brackets 56, from the next higher strips 46b.

A downwardly and outwardly inclined channel member 57 extends along the lower edge of each collecting electrode, in position to receive precipitated material from the interior collecting space of such electrode, the side walls of each of said channels embracing the inwardly offset inclined edge portions 47' of the corresponding electrode, as shown in Figs. 10 to 13. The several channels 57 are spaced from one another to provide passages 58 therebetween to permit free vertical flow of gas into or out of the gas passage spaces between the collecting electrodes. The channels 57 may be supported in any suitable manner, as by supporting members 59 and 61.

The lower ends of said channels communicate with downwardly inclined passages 62 extending through the end walls 42 and opening into receptacles or hoppers 63 comparable to the above mentioned hoppers 34.

Each discharge electrode unit is shown as comprising vertical frame members 66, a top frame member 67, bottom frame members 68, and intermediate horizontal frame members 69, and a plurality of suitably spaced horizontal discharge electrode members 71 such as wires, or small diameter rods. Said discharge electrode units may be suppported and insulated in any suitable manner, for example in a manner similar to that shown in the first described form of the invention.

In this form of apparatus, also, means may be provided for dislodging precipitated material from the outer surfaces of the collecting electrode units. For example, a rapping hammer 73 may be provided, arranged to strike against an impact member 74 secured to the one end of the supporting bar 59, and said bar may be secured to the channels 57 in such manner as to transmit the resulting jarring action to said channels and thence to the collecting electrodes due to engagement of said channels with the lower ends of said electrodes. The rapping action thus obtained is comparable to that described in said Patent No. 1,882,949.

In the operation of apparatus provided with collecting electrodes of this last described type, the gas may be passed through the successive precipitator sections in the same manner as above described. In passing through each section, the material electrically precipitated upon the surfaces of the collecting electrodes, that is, upon the outer surfaces of the strips 46, falls downwardly and passes inwardly through the slots 49 into the interior collecting spaces 45. The direction of gas flow is preferably upward, and since the slots 49 are directed upwardly and outwardly, there is little or no flow of gas into and through the interior collecting spaces 45. The material entering these spaces therefore falls downwardly therein, in a quiescent zone separated from the gas stream flowing in passages 44. The material falling to the bottom of each collecting electrode enters the corresponding channel 57 and is conducted thereby into one of the receptacles 63. It will be seen that in this case also the material precipitated in each section is separately collected below the collecting electrodes of that section, and is separately removed from the gas stream.

Numerous modifications may be made in the shape, arrangement, and construction of the collecting and discharge electrodes, and other parts of the apparatus, without departing from the spirit of the present invention, the scope of which is defined in the appended claims. For example, while we have shown the lower edges of the collecting units, and the channel members for collecting the precipitated material, as being inclined downwardly toward the walls of the housing at each end of said electrode units, and have shown a receptacle, such as 34 or 63, adjacent the wall of the housing at each end of said electrode units, it will be apparent that said collecting electrode units and channel members may be inclined downwardly in one direction only, from one end of the electrode units to the other end, and a receptacle may be provided adjacent the wall of the housing at the last-named end only. The constructions illustrated, however, are particularly advantageous, in that they reduce the height through which the inclined portions extend and thus provide for utilization of a relatively large proportion of the total space within the housing for electrical precipitation purposes, and also facilitate the provision of centrally disposed supporting frame means for the discharge electrode system of each section, as shown.

We claim:

1. In an electrical precipitator, the combination comprising a vertically extending housing, two electrical precipitator sections disposed one above the other within said housing and each provided with discharge electrode means and collecting electrode means, the collecting electrode means in the upper precipitator section comprising a plurality of collecting electrode units disposed in substantially parallel vertical planes, and channel members disposed adjacent the lower edges of the respective collecting electrodes of said upper section, in position to receive precipitated material falling from said electrodes and to conduct such material out of the path of gas within said housing, said channel members being spaced from one another to permit a substantially vertical flow of gas from one section to the other, and means for passing gas in a substantially vertical direction through said housing and through both of said precipitator sections.

2. In an electrical precipitator, the combination set forth in claim 1, in which each of said collecting electrode units comprises two spaced slotted side walls defining an interior collecting space adapted to receive precipitated material, and in which said channel members extend along and parallel to the lower edges of the respective collecting electrode units in position to receive material falling within said interior collecting spaces of said electrodes.

3. In an electrical precipitator, the combination set forth in claim 1, in which each of said collecting electrode units comprises a vertical plate, and in which said channel members extend along and parallel to the lower edges of the respective collecting electrode units in position to receive material from the surface of said electrode units.

4. In an electrical precipitator, the combination set forth in claim 1, and also comprising a receptacle adjacent a wall of said housing at one end of the collecting electrode units of said upper precipitator section, said channels being inclined downwardly toward said end of said units and having their lower ends positioned to deliver material into said receptacle.

5. In an electrical precipitator, the combination comprising a vertically extending housing, two electrical precipitator sections disposed one above the other within said housing and each provided with discharge electrode means and collecting electrode means, the collecting electrode means in the upper precipitator section comprising a plurality of collecting electrode units disposed in substantially parallel vertical planes, and having their lower edges inclined downwardly toward at least one side of said housing, and channel members disposed adjacent the lower edges of the respective collecting electrodes of said upper section, in position to receive precipitated material falling from said electrodes and to conduct such material out of the path of gas within said housing, said channel members being spaced from one another to permit a substantially vertical flow of gas from one section to the other, and means for passing gas in a substantially vertical direction through said housing and through both of said precipitator sections.

6. In an electrical precipitator, the combination comprising a vertically extending housing, two electrical precipitator sections disposed one above the other within said housing and each provided with discharge electrode means and collecting electrode means, the collecting electrode means in the upper precipitator section comprising a plurality of collecting electrode units disposed in substantially parallel vertical planes, and having their lower edges inclined downwardly from the center toward opposite sides of said housing, and channel members disposed adjacent the lower edges of the respective collecting electrodes of said upper section, in position to receive precipitated material falling from said electrodes and to conduct such material out of the path of gas within said housing, said channel members being spaced from one another to permit a substantially vertical flow of gas from one section to the other, and means for passing gas in a substantially vertical direction through said housing and through both of said precipitator sections.

HEINRICH BERNHARD RÜDER.
HERMANN FIESEL.